United States Patent
Curcio et al.

(10) Patent No.: US 9,891,967 B2
(45) Date of Patent: Feb. 13, 2018

(54) MULTI-TOUCH ATTRIBUTION MODEL FOR VALUING IMPRESSIONS AND OTHER ONLINE ACTIVITIES

(71) Applicant: Aggregate Knowledge, Inc., San Mateo, CA (US)

(72) Inventors: Matthew David Curcio, San Francisco, CA (US); Robert Lawrence Grzywinski, Chicago, IL (US); Benjamin Charles Linsay, Newton, MA (US)

(73) Assignee: AGGREGATE KNOWLEDGE, INC., San Mateo, CA (US)

(*) Notice: Subject to any disclaimer, the term of this patent is extended or adjusted under 35 U.S.C. 154(b) by 0 days.

(21) Appl. No.: 14/688,184

(22) Filed: Apr. 16, 2015

(65) Prior Publication Data

US 2015/0220974 A1    Aug. 6, 2015

Related U.S. Application Data

(63) Continuation of application No. 13/442,759, filed on Apr. 9, 2012, now Pat. No. 9,037,483.

(60) Provisional application No. 61/473,084, filed on Apr. 7, 2011.

(51) Int. Cl.
  *G06F 9/00* (2006.01)
  *G06F 9/54* (2006.01)
  *G06Q 30/02* (2012.01)

(52) U.S. Cl.
  CPC ......... *G06F 9/542* (2013.01); *G06Q 30/0246* (2013.01); *G06Q 30/0253* (2013.01)

(58) Field of Classification Search
  None
  See application file for complete search history.

(56) References Cited

U.S. PATENT DOCUMENTS

| | | | |
|---|---|---|---|
| 7,552,113 B2* | 6/2009 | Roe et al. | |
| 7,949,563 B2* | 5/2011 | Collins | 705/14.43 |
| 8,126,881 B1* | 2/2012 | Sethi et al. | 707/723 |
| 8,417,715 B1* | 4/2013 | Bruckhaus et al. | 707/758 |
| 2005/0234761 A1* | 10/2005 | Pinto et al. | 705/10 |
| 2006/0253537 A1* | 11/2006 | Thomas | 709/206 |
| 2007/0011224 A1* | 1/2007 | Mena | 709/200 |
| 2007/0027754 A1* | 2/2007 | Collins et al. | 705/14 |
| 2007/0094066 A1* | 4/2007 | Kumar et al. | 705/10 |
| 2007/0138268 A1* | 6/2007 | Tuchman | 235/383 |
| 2007/0208610 A1* | 9/2007 | Pisaris-Henderson et al. | 705/10 |
| 2008/0091448 A1* | 4/2008 | Niheu et al. | 705/1 |
| 2008/0120278 A1* | 5/2008 | Roe et al. | 707/3 |

(Continued)

OTHER PUBLICATIONS

Wilcritchlow "How to Get Past Last-touch Attribution with Google Analytics" http://www.seomoz.org/blog/how-to-get-past-last-touch-attribution-with-google-analytics, Jan. 13, 2010 (accessed Mar. 30, 2012), pp. 1-10.

(Continued)

*Primary Examiner* — Gurkanwaljit Singh
(74) *Attorney, Agent, or Firm* — Mahamedi IP Law LLP (57) ABSTRACT

To implement a multi-touch attribution model, a conversion event resulting from user activity is programmatically detected. A set of events that precede the conversion event is identified. Respective events of the set occur on respective websites. The conversion event is attributed to multiple websites of the respective websites.

4 Claims, 6 Drawing Sheets

(56) References Cited

U.S. PATENT DOCUMENTS

| | | | |
|---|---|---|---|
| 2010/0179855 A1* | 7/2010 | Chen et al. | 705/10 |
| 2011/0071900 A1* | 3/2011 | Kamath et al. | 705/14.46 |
| 2011/0184806 A1* | 7/2011 | Chen et al. | 705/14.52 |
| 2011/0258049 A1* | 10/2011 | Ramer et al. | 705/14.66 |
| 2011/0314142 A1* | 12/2011 | Newton | 709/224 |
| 2012/0143861 A1* | 6/2012 | Sethi et al. | 707/731 |
| 2012/0215622 A1* | 8/2012 | Ramer et al. | 705/14.44 |
| 2012/0215623 A1* | 8/2012 | Ramer et al. | 705/14.44 |
| 2012/0278091 A1* | 11/2012 | Yaseen et al. | 705/1.1 |
| 2013/0138507 A1* | 5/2013 | Kumar et al. | 705/14.54 |
| 2013/0218805 A1* | 8/2013 | Mao et al. | 705/36 R |

OTHER PUBLICATIONS

Shah, Siddharth, "Click to Conversion Time & Your Revenue Attribution Window," https://searchengineland.com/click-to-conversion-time-your-revenue-attribution-window-36700, Feb. 26, 2010 (accessed Mar. 30, 2012), pp. 1-4.

Brown, Matthew T. "An Analysis of Online Marketing in the Sport Industry: User Activity, Communication Objectives, and Perceived Benefits."

Aly, Mohamed, et al. "Web-scale user modeling for targeting." Proceedings of the 21st international conference companion on World Wide Web. ACM, 2012.

Pandey, Sandeep, et al. "Learning to target: what works for behavioral targeting." Proceedings of the 20th ACM international conference on Information and knowledge management. ACM, 2011.

Liu, Yandong, et al. "Finding the right consumer: optimizing for conversion in display advertising campaigns." Proceedings of the fifth ACM international conference on Web search and data mining. ACM, 2012.

de Santana, Vagner Figueredo de Figueredo, and M. Cecilia C. Baranauskas. "A prospect of websites evaluation tools based on event logs." Human-Computer Interaction Symposium. Springer US, 2008.

Edmonds, Andy, et al. "Instrumenting the dynamic web." Journal of Web Engineering 6.3 (2007): 243.

* cited by examiner

FIG. 5

MULTI-TOUCH ATTRIBUTION MODEL FOR VALUING IMPRESSIONS AND OTHER ONLINE ACTIVITIES

RELATED APPLICATION

This application is a continuation of U.S. patent application Ser. No. 13/442,759, titled "Mufti-Touch Attribution Model for Valuing Impressions and Other Online Activities" filed Apr. 9, 2012, which application claims the benefit of U.S. Provisional Patent Application No. 61/473,084, titled "Multi-Touch Attribution Model for Valuing Impressions and Other Online Activities," filed Apr. 7, 2011, which is hereby incorporated by reference herein in its entirety.

TECHNICAL FIELD

The disclosed embodiments relate to the field of advertising. More particularly, the disclosed embodiments relate to mufti-touch attribution modeling for valuing impressions and other online activities in the context of conversion events.

BACKGROUND

The current state of attribution modeling for display advertising is problematic for many applications. Standard approaches inadequately value inventory and intentionally disregard a large majority of information that could be used to improve an advertiser's return on its ad spend.

Attribution modeling refers to techniques that attribute correlation with or causality for a designated or defined event (sometimes referred to as a "conversion event") to one or more preceding events or activities. In the field of online advertisement, for example, attribution modeling seeks to correlate or attribute causality for a conversion event (e.g., a user online transaction or download of a specific web page) to a past event (e.g., an online ad impression delivered to the user before the conversion event). An example of an attribution modeling technique in the field of online advertisement is the Last Touch Attribution Model (LTAM), which credits any downstream action (e.g., conversion event) with its most recent ad impression or click. This model is so simple and direct that a majority of information from most advertising campaigns is discarded in its use. Aside from being simple to compute, LTAM is also easy to explain, which contributes to its pervasiveness. However, LTAM ignores preceding events that may deserve partial credit for a conversion event.

Accordingly, there is a need for more sophisticated models to value impressions and other online activities or events that may relate to conversion events.

BRIEF DESCRIPTION OF THE DRAWINGS

The present embodiments are illustrated by way of example and are not intended to be limited by the drawings. Like numbers reference like elements throughout the drawings and specification.

DETAILED DESCRIPTION

Embodiments disclosed herein include systems and methods for implementing a multi-touch attribution model for valuing a user's tracked activities, online or otherwise. Such a model is used to value impressions and other activities or events that occur before a conversion event. In the field of online advertisement and promotions, an impression refers to the display of an online advertisement or similar content and conversion events refer to online user activities that are priced and compensated upon their occurrence. Conversion events can correspond to any type of online behavior that an advertiser deems of value.

Embodiments described herein use a multi-touch attribution model to compute values of media impressions and similar events by performing calculations over chains (e.g., complete chains) of user events. Embodiments include attribution modeling techniques and systems that provides a flexible, accurate, and mathematically sound approach to obtaining a measure of attribution. In some embodiments, histories of user events are maintained using server-side storage, as opposed to cookies.

Some embodiments described herein are based on an energy decay concept derived from physical systems. Such embodiments assume that a user's interest rises in response to advertising interactions and decays during the time between advertising interactions. These interactions can be ad impressions, clicks, search events, conversion events, or other activity.

Embodiments described herein effectively measure marketing efficiency and enable more educated advertising budgeting decisions.

According to one or more embodiments, a method is provided in which an analysis is performed on a time-ordered browsing history of multiple users in a given population. The analysis includes identifying each web site visited by individual users of the population over a predetermined amount of time before the occurrence of a common conversion event. Once the browsing history is determined, modeling is performed to identify those sites that are contributors to the common conversion event. The modeling is based on identifying commonality in the browsing history of the users who share common conversion events. The commonality analysis may include identifying one or more common web sites in the time-ordered browsing history of individual users. Common events, such as common web sites visited by users sharing a conversion event, are identified as part of a model. For example, each of the web sites may be assigned a contribution value corresponding to the effect the web site had on the common conversion event.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist on a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, a system may use memory, processors and network resources (e.g., including data ports and signal lines (optical, electrical, etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and computer-readable mediums on which instructions for implementing one or more embodiments can be executed and stored. In particular, machines shown with one or more embodiments include processor(s) and various forms of memory for holding data and instructions. Examples of computer-readable storage mediums include permanent memory storage devices, such as hard drives on personal computers or servers. Other examples of computer-readable storage mediums include portable storage units, such as CD or DVD units, flash memory (such as carried on many cell phones and personal digital assistants (PDAs)), and magnetic memory. Computers, terminals, and network-enabled devices (e.g., portable devices such as cell phones) are all examples of machines and devices that use processors, memory, and instructions stored on computer-readable mediums.

Figure 1:
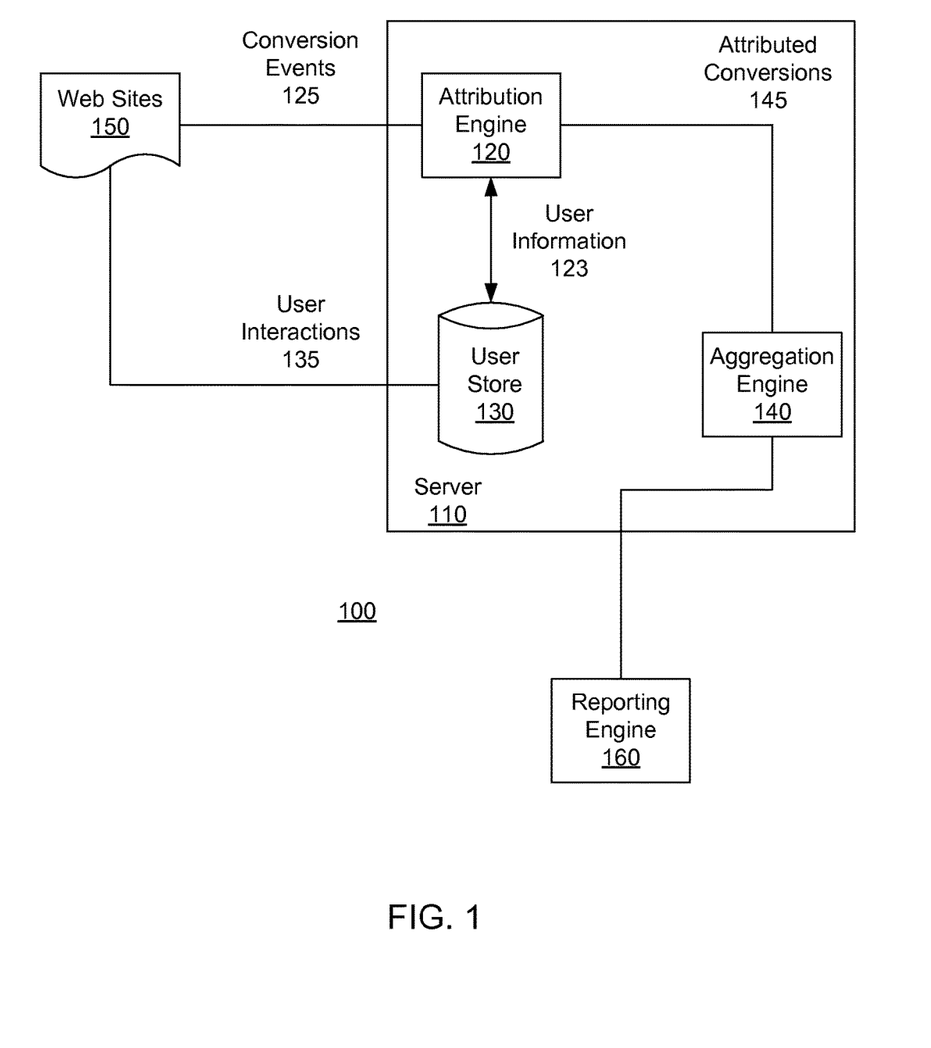
FIG. 1 illustrates a system for determining an amount of influence one or more web sites had on a particular conversion event according to one or more embodiments.

FIG. 1 illustrates a system 100 for implementing a multi-touch attribution model for analyzing and determining value corresponding to the influence of certain online activities or events leading to a conversion event, according to one or more embodiments. A system 100 includes components for (i) storing user interactions with each of the various web sites and/or an advertisement on the various web sites, (ii) attributing conversion events to the user interactions using a browsing history of each user, and (iii) aggregating data regarding the conversion events to facilitate reporting.

According to an embodiment, the system 100 includes a server 110 that includes an attribution engine 120 and a user store 130. In certain embodiments, the attribution engine receives conversion events 125 from one or more web sites 150. In the context of online advertisement, examples of a conversion event 125 include an event in which a user purchases an item, views a web page, hovers a cursor over an advertisement, enters input (e.g., for product research), and so on. As discussed above, a conversion event can be any behavior that is deemed to be of value by an advertiser or a user of the system 100.

Numerous additional examples of conversion events exist in online environments, such as a user downloading a designated web page containing a form (e.g., to sign up for a service), a user taking part in a survey, and a user opting-in for a particular online feature or service.

The user store 130 is configured to receive and store a plurality of user activities 135, also referred to as user interactions or events, from the one or more web sites 150. User activities 135 may include the browsing history of one or more users, a plurality of time-ordered impressions provided to users, and user interactions with an advertisement or web site 150 (e.g., the user clicking on, hovering over, or viewing an advertisement; the user entering search terms; etc.). Stored information regarding impressions may include an owner of an advertisement on a particular web site or group of web sites, an advertising campaign, advertisement size, advertisement placement, and so on. The user store 130 may also store data corresponding to the identification of a user, as well as other information or attributes (e.g., demographics, geographic location, psychographics, etc.). Still further, the user store 130 may also store information corresponding to the date and time a user interacted with each web site and/or advertisement on each web site. Upon detection of a conversion event 125, data corresponding to the conversion event 125 is received at the attribution engine 120. In certain embodiments, the data corresponding to the conversion event 125 may include the type of conversion event (e.g., purchase, loan application, etc.), the value or cost of the conversion event (e.g., how much the user spent when completing the conversion event), or other such data. In response to detecting the conversion event 125, the attribution engine 120 requests user information 123 from the user store 130. In certain embodiments, the user information 123 includes data corresponding to the user interactions 135 described above.

The attribution engine 120 is configured to determine points of commonality in the individual user's web browsing experiences. In particular, the attribution engine 120 identifies user activities that preceded the conversion event, such as websites visited, impressions viewed, and so on. As described, the attribution engine 120 is also configured to assign a value to specific types of online activity that preceded a conversion event. In some embodiments, the attribution engine 120 groups activities that preceded the conversion invent into clusters. For example, multiple impressions occurring within a specified period of time (e.g., within a 30-second period, or a one-minute period, or a period of several minutes) are clustered into a single event and thus treated as a single event by the attribution engine 120. Such clustering helps to foil attempts (e.g., cookie-bombing) to trick the attribution engine 120.

In certain embodiments, the attribution engine 120 uses the user information 123 to determine which advertisements a user interacted with on a particular web site even if the conversion event 125 did not occur immediately after the interaction with the advertisement and/or the web site.

For example, according to embodiments described herein, if a user visited Web Site 1 and saw an advertisement for a particular brand of shoes and either clicked on, watched, hovered over, or otherwise interacted with the advertisement on Web Site 1, that information is stored in the user store 130. As a result, when the conversion event 125 occurs (e.g., the user purchases the particular brand of shoes), Web Site 1 may be at least partially credited for the conversion event although the conversion event 125 may not have occurred directly as a result of the user visiting Web Site 1 (e.g., the user may have visited Web Site 1 two days before the conversion event and/or the user may have navigated to other web sites between visiting Web Site 1 and purchasing the particular brand of shoes). Web Site 1 may be provided attribution credit even though multiple intervening events occurred between the user viewing the advertisement at Web Site 1 and then making the purchase. Under conventional techniques, such events would lead to a result in which the ad impression viewed on Web Site 1 is not credited. Under multi-touch attribution modeling, such as described, the ad impression on Web Site 1 may be counted and thus credited if it appears in the user's browsing history.

To determine the attribution of each web site to a conversion event 125, the attribution engine 120 may be configured to identify each event in a user's browsing history, starting from the most recent in time (e.g., just before the conversion event) to the least recent. In certain embodiments, the user's browsing history may span a finite specified time (e.g., 30 days/1 month, or 60 days, or 90 days) referred to as a look-back window. In some embodiments, the time is user-specified. In other embodiments, the user's browsing history may span multiple conversion events regardless of whether the multiple conversion events are or are not related in subject matter. In some embodiments, multiple impressions or other activities that occur in quick succession (e.g., within a period spanning a specified number of seconds or minutes, such as 30 seconds or one minute) are clustered as a single event in the browsing history.

Generally, individual impressions (or clusters of impressions) in the user's history are analyzed by the attribution engine 120. The attribution model 120 determines which of the impressions (e.g., websites, advertisements) contributed to the conversion event 125. In certain embodiments, each user interaction with an advertisement on a web site is combined with a time function (e.g., a function of a length of time preceding the conversion event) to determine a weighted contribution or attribution value of each of the web sites in the browsing history. For example, a web site visited two days before the conversion event may not be given as much weight as a web site that was visited just one day, hours, or even minutes before the conversion event 125. In another embodiment, the aggregation engine 120 may be configured to determine a chain of web sites that contributed to the conversion event even though the web sites in the chain are not related in subject matter, either to each other, and/or to the subject matter of the conversion event 125.

In some embodiments, the number of events analyzed by the attribution engine 120 and/or attributed partial credit for a conversion event is limited to no more than a specified number of events. For example, if the specified number is N, then partial credit for a conversion event is attributed to, at most, the N most recent events preceding the conversion event. In some instances, N is in the range of 10-20. Alternately, all preceding events in the browsing history (e.g., with the specified timespan corresponding to the browsing history) are considered for possible attribution.

For example, if a user visited Web Site 1 and interacted with an advertisement about a particular brand of shoes, then afterward, visited a news web site, followed by an entertainment web site and a sports web site, and then purchased the particular brand of shoes, Web Site 1 would be given at least partial credit for the conversion event. Furthermore, as will be discussed below, based on the particular chain of user events, an advertiser may want to purchase advertisement space on a web site or web sites having a particular theme or subject matter if it is determined that multiple users visited those web sites before a common conversion event between the multiple users.

In certain embodiments, the attribution engine 120 may be configured to determine or identify a common event preceding a conversion event between different users. For example, the attribution engine 120 may identify ten users that purchased a pair of shoes at a particular online store. Once the common conversion event is identified, the attribution engine 120 may request user information 123 corresponding to each of the ten users. After which, the attribution engine 120 may determine which of the web sites of each of the user's history contributed to the conversion event.

Time-Energy Calculations

The attribution engine 120 performs calculations on the incoming data. In one embodiment, the attribution engine 120 implements calculations that model each user as a system with a variable amount of energy that, over time, seeks a global baseline state. This "energy" is analogous to, and used as a proxy for, the user's presumed interest level. When viewed as an energy function, acts deemed to be of interest represent energy addition, subject to decay by time (as well as optionally subtraction by other intervening events). Different values in the energy curve indicate the different level of engagement that the user has. The user activities that correlate to the energy values comprise the events that receive attribution for a subsequent conversion event.

More specifically, events in the history preceding the conversion event add or deplete energy from the user's interest level. In particular, one or more embodiments provide that certain events, such as, for example, click events, add energy to the model, while other events, such as, for example, tightly clustered ads, remove energy from the model. Energy injection and extraction for other reasons may be supported via additional types of event meta-data (e.g., ad size, placement, etc.). An attribution decay function is applied to further highlight the change of the model over time. This separate decay is a time effect representing the heuristic that temporally distant events from a conversion event should not be attributed credit for the conversion event or should be attributed less credit for the event. The attribution decay concept more accurately weights past events that contributed to a conversion event than the traditional attribution window. Under an embodiment described, for example, events preceding a conversion event are not modeled for attribution based solely on a timeline or preceding event, but rather analyzed over a preceding duration that takes into account events/activities that peak user interest.

Figure 2A:
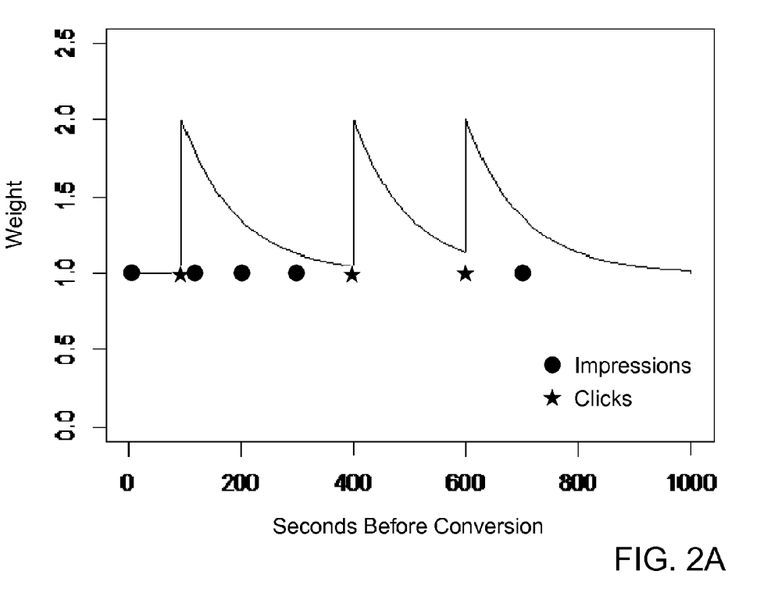
FIG. 2A through FIG. 2C illustrate calculations performed in implementing a multi-touch attribution model according to one or more embodiments.

Chain Energy Calculation:

To calculate the energy of a chain, and thus the presumed interest level of a user, at a particular point in time, each event in a user chain is visited in order, from least to most recent. A prophetic example of a chain energy calculation is shown in FIG. 2A. The x-axis of FIG. 2A shows time before a conversion event: the conversion event occurs at time zero, and the farther along the x-axis an event is, the further back in time the event is. The y-axis of FIG. 2A is the modeled chain energy value, which is assumed to reflect the interest level of the user. If an event (e.g., an impression) is determined to be related to the conversion event, the chain energy value at the point in time when the event occurs is applied to the event as a weighting factor. In the example of FIG. 2A, the chain energy has a baseline value of 1.0, and increases (e.g., as a step function) to a value of 2.0 in response to a click event or other user interaction (e.g., in response to a user clicking on, or otherwise interacting with, an impression). After the click event (or other user interaction), the chain energy decreases toward the baseline value. For example, the chain energy decreases based on an exponential decay having a heuristically determined time constant.

The amount that the chain energy increases in response to a user interaction may be referred to as a click weighting. In the example of FIG. 2A, the click weighting is 1.0 (=2.0-1.0). In other examples, the click weighting may be in the range of 1-10, or equal to 100 or more, or 1000 or more. The click weighting may be determined empirically and may vary from application to application.

Attribution Decay

Figure 2B:
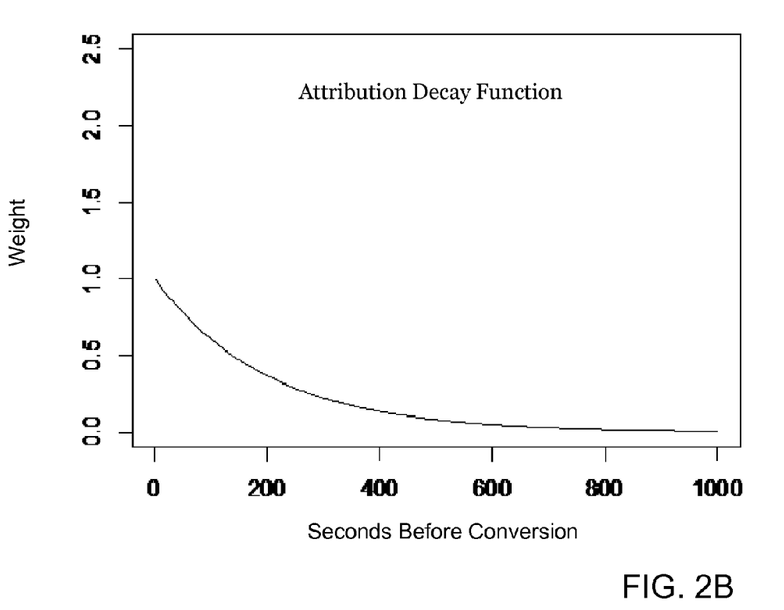

In some embodiments, when a conversion event occurs, an attribution decay function is combined with the chain energy function to arrive at the final attribution allotment. The attribution decay may be an exponential function that runs to zero at the end of the client-specified attribution window, as shown by FIG. 2B. The exponential function has a corresponding half-life, the value of which may be determined empirically and may vary from application to application. Examples of half-lives may be in the range of 1-5, or 1-10, or 1-30 or more. Alternatively, the attribution decay may have an alternative form, such as another time-dependent curve.

In FIG. 2B, the x-axis has the same meaning as in FIG. 2A, and the y-axis is the value of the attribution decay function. If an event (e.g., an impression) is determined to be related to the conversion event, the value of the attribution decay function value at the point in time when the event occurs is applied to the event as a weighting factor. In the example of FIG. 2B, the attribution decay function is normalized to a value of 1.0 at the time of the conversion event, and decreases (e.g., in an exponential manner having a specified half-life) to a value of 0.0 at a specified time before the conversion event. The attribution decay function is separate from the decreases in the chain energy value of FIG. 2A between click events.

Figure 2C:
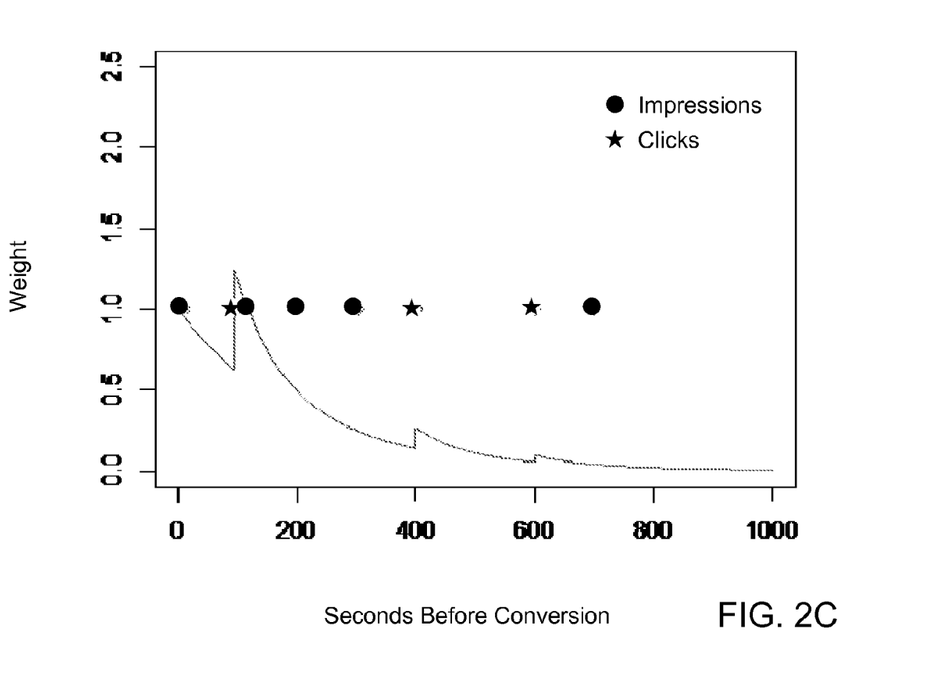

According to some embodiments, these two functions (i.e., the chain energy function of FIG. 2A and the attribution decay function of FIG. 2B) are multiplied to obtain a composite weighting function as the final result, as depicted in FIG. 2C. If an event (e.g., an impression) is determined to be related to the conversion event, the value of the composite weighting function at the point in time when the event occurs is applied to the event as a weighting factor. Applying the value of the composite weighting function to an event thus weights the event based on both the chain energy model and the attribution decay.

The extent of the timeline in each of FIGS. 2A-2C is heuristic. In some embodiments, user chains and energy decays can span months. The stable state, here set to 1.0, is a tunable parameter of the model.

This composite function now specifies a value for events (e.g., every event) in a user's chain. These values are summed together, and then normalized such that the sum of all the values in a user's chain is 1. Although normalization to 1 is specifically mentioned, it is contemplated that the values may be summed to any value. These values are then "partial conversions"—the fraction of the conversion event that is attributed to each event in the chain. Each event in the chain is attributed its respective partial credit for the conversion event, multiplied by the original value of the conversion event. For example, an event is assigned a partial credit of 0.5 conversions for a conversion event worth $10. The event then has 0.5 conversions worth $5 attributed to it.

The following pseudo-code provides an example of logic on which the attribution engine 120 is implemented.

```
# Walk through the model, letting energy decay
for event in reversed(events):
    delta = (previous energy -
        stable_state)*(damping**abs(event.time-last_time))
    # Inject energy
    if event.is_click:
        energy += energy_bonus
        event.raw_value = stable + delta
    # Time decay
    if event.is_impression:
        event.scaled_value =
event._raw_value*time_decay(event.time)
    # Normalize the values
    total_value = sum(event.scaled_value for impressions in events)
    for event in events:
        if event.is_impression:
            event.final_value = event.scaled_value / total_value
```

Referring back to FIG. 1, the server 110 may also include an aggregation engine 140 that receives the attributed conversions 145 from the attribution engine 120. The aggregation engine 140 may aggregate the data and transmit the data to a reporting engine 160. The reporting engine 160 may be configured to output the data to an end user for analysis.

Figure 3:
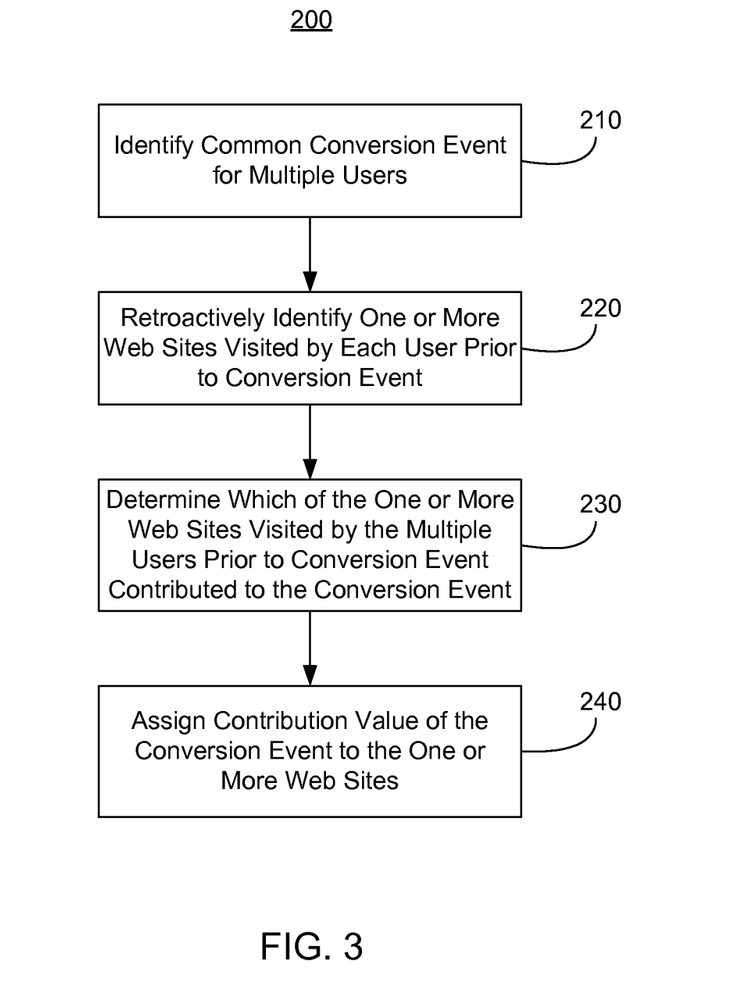
FIG. 3 is a flow chart illustrating a method for attributing a conversion event to one or more web sites according to one or more embodiments.

FIG. 3 is a flow chart illustrating a method 200 for attributing a conversion event to one or more web sites according to one or more embodiments. In some embodiments, the method 200 may be used in conjunction with system 100 such as described above with respect to FIG. 1. Therefore, the following description may refer to one or more components described with respect to FIG. 1. However, any such references to the components of FIG. 1 are merely examples.

Method 200 begins when a common conversion event for multiple users is identified 210. In certain embodiments the common conversion event may correspond to multiple users purchasing the same or similar product (e.g., a pair of shoes). In another embodiment, the common conversion event may correspond to multiple users making a purchase at a particular on-line store or visiting a particular web site.

Once the common conversion event has been identified, one or more web sites visited by each of the users prior to the conversion event are identified 220. As described above, the one or more web sites (e.g., browsing history) and/or user interactions with an advertisement on each of the web sites may be stored in a storage device (e.g., user store 130, FIG. 1) and retrieved by a component of the server, such as, for example, attribution engine 120 (FIG. 1).

For individual users, a determination is made as to which of the impressions (or clusters thereof) contributed to the conversion event 230. An energy model, such as described with regard to FIGS. 2A-2C, may be used in determining which impressions are to receive attribution value. In certain embodiments, it may be determined, based on user interactions with each of the web sites, that a plurality of the web sites (e.g., two or more, three or more, four or more, etc.) contributed to the conversion event even though the web sites were visited by one or more of the multiple users hours, days, weeks or even months before the conversion event.

Referring back to FIG. 3, once a determination is made as to which of the one or more web sites contributed to the common conversion event, a contribution value of the conversion event is assigned to each of the one or more impressions 240, and thus to the web sites associated with the impressions. In certain embodiments, a contribution value may be assigned to multiple web sites even if one of the web sites was visited hours, days, weeks or even months before the conversion event.

In another embodiment, the contribution value of each web site may be weighted according to when the web site was visited versus when the conversion event occurred. For example, if it is determined that Web Site 1 and Web Site 2 both contributed to the conversion event but Web Site 1 was visited just before the conversion event, both web sites would receive credit for the conversion event but Web Site 1's credit may be weighed heavier than Web Site 2's credit (e.g., based on the attribution decay function of FIG. 2B).

Figure 4:
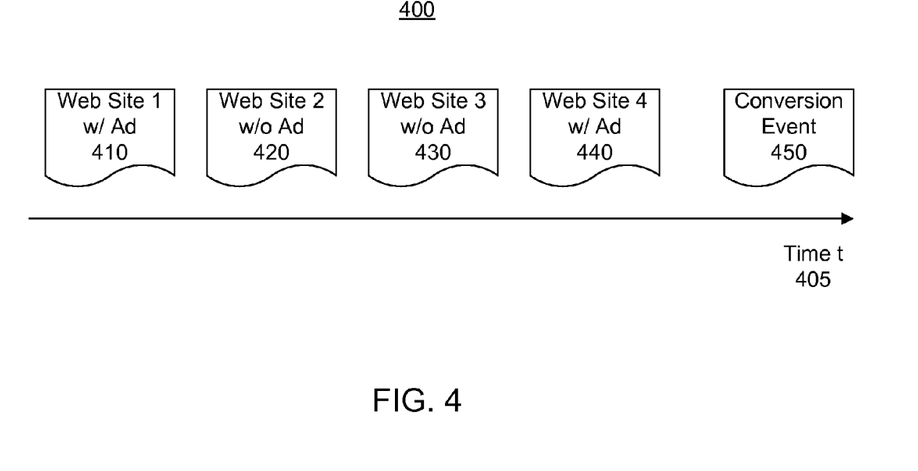
FIG. 4 illustrates a browsing history in which multiple web pages are analyzed to determine whether a particular web site contributed to a conversion event according to one or more embodiments.

FIG. 4 illustrates a browsing history in which multiple web pages are analyzed to determine whether a particular web site contributed to a conversion event according to one or more embodiments. The browsing history 400 is shown with respect to a timeline t 405. As shown in FIG. 4, a user visited four different web sites in the time period t 405 before the conversion event 450. Based on the methods described above, each of the four web sites may be analyzed to determine which web site, if any should be assigned a weighted attribution value for the conversion event 450.

In this example, the user first visited Web Site 1 410, which contained an advertisement corresponding to the conversion event 450. The user then visited Web Site 2 420, which did not have an advertisement and was not related in subject matter to the conversion event 450. After visiting Web Site 2 420, the user navigated to Web Site 3 430, which also did not have an advertisement but was related in subject matter to the conversion event 450. Finally, the user visited Web Site 4 440, which had an advertisement corresponding to the conversion event 450.

Based on this browsing history 400, it may be determined that Web Site 4 440 directly contributed to the conversion event 450 as Web Site 4 440 was visited just before the conversion event 450. Furthermore, Web Site 4 440 has an advertisement that corresponds to the conversion event 450. However, because Web Site 1 410 was also in the user's browsing history and also contained an advertisement that corresponds to the conversion event 450, it may be determined that Web Site 1 410 also contributed to the conversion event 450.

As such, based on a time value between when each of Web Site 1 410 and Web Site 4 440 were visited by the user and the occurrence of the conversion event, each of Web Site 1 410 and Web Site 4 440 is assigned a weighted contribution value. In an embodiment, as Web Site 4 440 was visited more recently in time with respect to the conversion event, Web Site 4 440 is given more of a contribution value than Web Site 1 410.

As described above, Web Site 3 430 was related in subject matter to the conversion event 450 but did not have an advertisement. According to some embodiments, if it is determined, based on a browsing history of multiple users (e.g., in accordance with FIG. 4 and FIGS. 2A-2C)—each of whom have in their history a conversion event similar to conversion event 450—that multiple users visited Web Site 3 430, or another web site that had a similar theme or subject matter to Web Site 3 430, then at a later time participated in the common conversion event 450, an advertiser may want to modify an advertising campaign to include Web Site 3 430 or other such similar site.

Web Site 2 420 did not have an advertisement nor is it related in subject matter to the conversion event 450. However, if it is determined, based on a browsing history of multiple users—each of which have a conversion event similar to conversion event 450—that multiple users visited Web Site 2 420 or another web site that had a similar theme or subject matter to Web Site 2 420, then at a later time participated in the common conversion event, an advertiser may want to modify an advertising campaign to include Web Site 2 420 although the subject matter of Web Site 2 420 does not correspond to the conversion event 450.

Computer System

Figure 5:
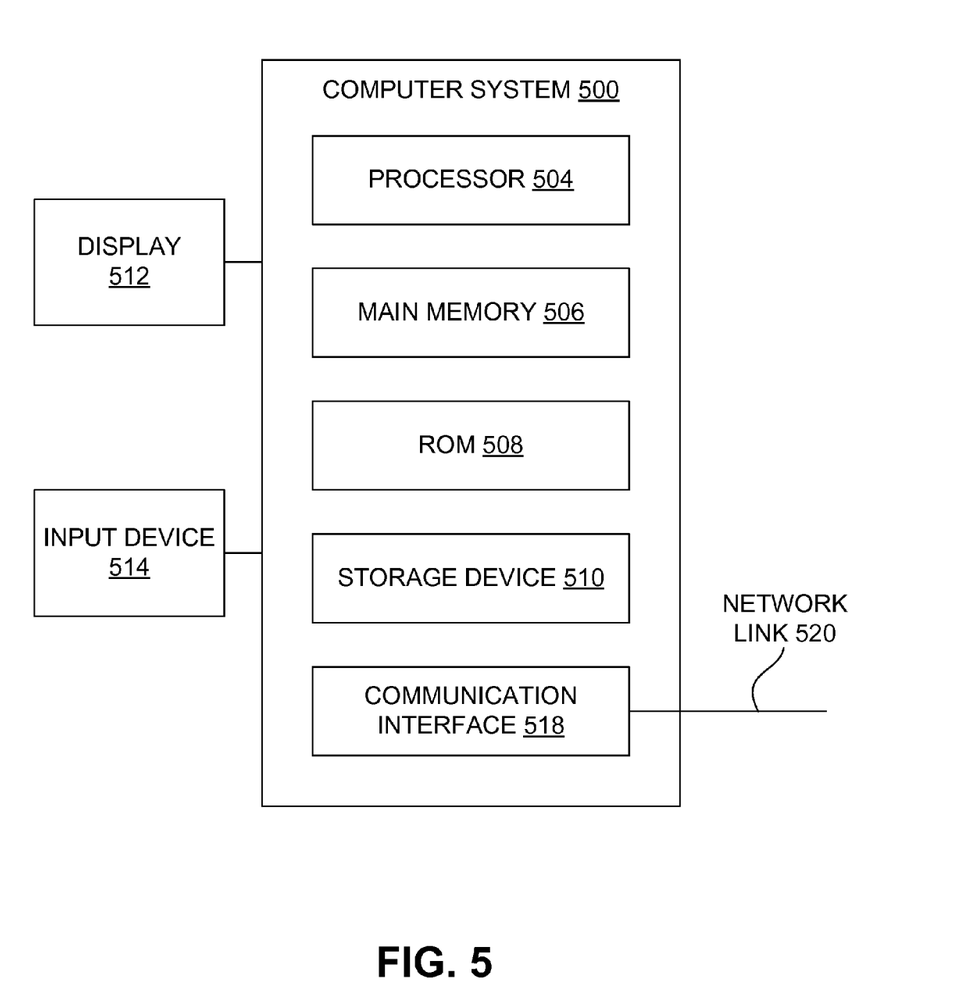
FIG. 5 is a block diagram that illustrates a computer system upon which one or more embodiments described herein may be implemented.

In an embodiment, one or more components of the system 100 (FIG. 1) may be implemented on or using a computer system. FIG. 5 is a block diagram that illustrates a computer system 500 upon which one or more embodiments may be implemented. In an embodiment, computer system 500 includes one or more processors 504, main memory 506, read-only memory (ROM) 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, or a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments disclosed herein may include any number of input devices 514 coupled to computer system 500.

One or more embodiments are related to the use of computer system 500 for implementing the techniques described herein. According to one embodiment, those techniques are performed by computer system 500 in response to the one or more processors 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement some embodiments. Thus, embodiments disclosed herein are not limited to any specific combination of hardware circuitry and software.

The term "machine-readable storage medium" as used herein refers to any medium that participates in storing instructions which may be provided to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, an EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by one or more processors 504 as it is received, and/or stored in storage device 510, or other non-volatile storage for later execution.

CONCLUSION

It is contemplated for embodiments described herein to extend to individual elements and concepts described herein, independently of other concepts, ideas or systems, as well as for embodiments to include combinations of elements recited anywhere in this specification. Although illustrative embodiments have been described in detail herein with reference to the accompanying drawings, it is to be understood that the disclosure is not limited to those precise embodiments. As such, many modifications and variations will be apparent to practitioners skilled in this art. Accordingly, it is intended that the scope of the disclosure be defined by the following claims and their equivalents. Furthermore, it is contemplated that a particular feature described either individually or as part of an embodiment can be combined with other individually described features, or parts of other embodiments, even if the other features and embodiments make no mention of the particular feature. This, the absence of describing combinations should not preclude the inventor from claiming rights to such combinations.

What is claimed is:

1. A method executed in a processor of a computing system, the method comprising:
   detecting, using the processor, multiple conversion events performed at multiple websites in response to at least one online advertisement presented on the multiple websites;
   determining, using the processor, that at least one of the multiple conversion events is a common conversion event amongst the multiple websites;
   identifying, using the processor, a set of click events that precede the common conversion event, the set of click events interacting with the multiple websites; and
   generating, using the processor, contribution values attributable to each website of the multiple websites based on the set of click events.

2. The method of claim 1, wherein each of the contribution values attributable to each of the multiple websites are diminished in accordance with a time preceding the common conversion event.

3. A non-transitory computer-readable storage medium storing one or more programs configured to be executed in a processor of a computer system, the one or more programs comprising instructions to:
   detect multiple conversion events performed at multiple websites in response to at least one online advertisement presented on the multiple websites;
   determine that at least one of the multiple conversion events is a common conversion event amongst the multiple websites;
   identify a set of click events that precede the common conversion event, the set of click events interacting with the multiple websites; and
   generate contribution values attributable to each of the multiple websites based on the set of click events.

4. The non-transitory computer-readable storage medium of claim 3, wherein each of the contribution values attributable to each of the multiple websites are diminished in accordance with a time preceding the common conversion event.

* * * * *